United States Patent
Ruhl et al.

(10) Patent No.: US 9,505,083 B2
(45) Date of Patent: Nov. 29, 2016

(54) METHOD FOR PRODUCING A NODE BY WELDING WITH THE SAME WIDTH FOR TWO WELDS

(71) Applicant: SCHUNK SONOSYSTEMS GMBH, Wettenberg (DE)

(72) Inventors: Sabastian Ruhl, Wetter (DE); Heiko Strobel, Munzenberg (DE); Tim Hanika, Langgoens/Oberkleen (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 0 days.

(21) Appl. No.: 14/897,843

(22) PCT Filed: Jul. 10, 2014

(86) PCT No.: PCT/EP2014/064867
§ 371 (c)(1),
(2) Date: Dec. 11, 2015

(87) PCT Pub. No.: WO2015/007619
PCT Pub. Date: Jan. 22, 2015

(65) Prior Publication Data
US 2016/0136753 A1    May 19, 2016

(30) Foreign Application Priority Data

Jul. 18, 2013 (DE) .................. 10 2013 107 637

(51) Int. Cl.
*B23K 1/06* (2006.01)
*B23K 20/10* (2006.01)
*B23K 20/233* (2006.01)

(52) U.S. Cl.
CPC ........... *B23K 20/10* (2013.01); *B23K 20/2333* (2013.01); *B23K 2201/32* (2013.01); *B23K 2203/10* (2013.01); *B23K 2203/12* (2013.01); *B23K 2203/18* (2013.01)

(58) Field of Classification Search
CPC ............ B23K 20/10–20/106; B23K 2203/18; B23K 20/2333; B23K 2203/12; B23K 2201/32; B23K 2203/10; B23K 1/06
USPC ...................... 228/110.1, 1.1, 180.5, 4.5, 904
See application file for complete search history.

(56) References Cited

U.S. PATENT DOCUMENTS

| 4,869,419 A | * | 9/1989 | Nuss | B23K 20/106 228/1.1 |
| 6,226,865 B1 | * | 5/2001 | Tanikawa | B23K 20/10 174/84 R |

(Continued)

FOREIGN PATENT DOCUMENTS

| DE | 10229565 B4 | 7/2004 | |
| DE | 102004044480 A1 | * 2/2006 | ............ B23K 20/10 |

(Continued)

OTHER PUBLICATIONS

International Search Report mailed Nov. 26, 2014, corresponding to International Patent Application PCT/EP2014/064867.

*Primary Examiner* — Kiley Stoner
(74) *Attorney, Agent, or Firm* — Ladas & Parry LLP

(57) ABSTRACT

The invention relates to a method for producing a node by welding at least one first stranded wire comprising individual wires to at least one second stranded wire comprising individual wires, the stranded wires being of different materials, in a compression chamber with adjustable height and width of an ultrasonic welding device, the width being adjusted by means of at least one lateral slide and the height by changing the distance between a sonotrode and a counter electrode of the ultrasonic welding device, the at least one first stranded wire being welded with a higher specific energy, under a higher pressure or with a greater ultrasonic vibration amplitude than the at least one second stranded.

9 Claims, 5 Drawing Sheets

(56) References Cited

U.S. PATENT DOCUMENTS

| | | | | |
|---|---|---|---|---|
| 6,452,101 B1* | 9/2002 | Haramaki | B23K 11/115 | 174/128.1 |
| 8,684,258 B2* | 4/2014 | Steiner | B23K 20/10 | 228/110.1 |
| 8,931,685 B2* | 1/2015 | Kataoka | H01R 4/021 | 228/110.1 |
| 2002/0017550 A1* | 2/2002 | Murakami | B23K 20/10 | 228/110.1 |
| 2004/0134062 A1 | 7/2004 | Jonli | | |
| 2006/0169742 A1* | 8/2006 | Fujimoto | H01R 4/187 | 228/4.5 |
| 2006/0283912 A1* | 12/2006 | Eberach | B23K 20/10 | 228/101 |
| 2007/0068991 A1* | 3/2007 | Handel | B23K 20/106 | 228/1.1 |
| 2008/0032569 A1* | 2/2008 | Steiner | B23K 20/10 | 439/874 |
| 2008/0128471 A1* | 6/2008 | Eberbach | B23K 20/106 | 228/1.1 |
| 2011/0062218 A1* | 3/2011 | Ohnuma | B23K 20/106 | 228/110.1 |
| 2011/0155701 A1* | 6/2011 | Gerst | B23K 11/0026 | 219/117.1 |
| 2012/0205423 A1* | 8/2012 | Takayama | H01R 43/0207 | 228/111 |
| 2013/0000949 A1* | 1/2013 | Torimoto | B23K 20/10 | 174/113 R |
| 2014/0312097 A1* | 10/2014 | Miyazato | H01R 43/00 | 228/111 |
| 2014/0353361 A1* | 12/2014 | Numata | H01R 43/0207 | 228/110.1 |
| 2015/0288123 A1* | 10/2015 | Wagner | B23K 20/106 | 228/110.1 |

FOREIGN PATENT DOCUMENTS

| | | |
|---|---|---|
| DE | 102005048368 B3 | 5/2007 |
| DE | 102007026707 B3 | 9/2008 |
| DE | 102011014801 A1 | 9/2012 |
| JP | 2007185706 A | 7/2007 |
| JP | 2012124078 A | 6/2012 |

* cited by examiner

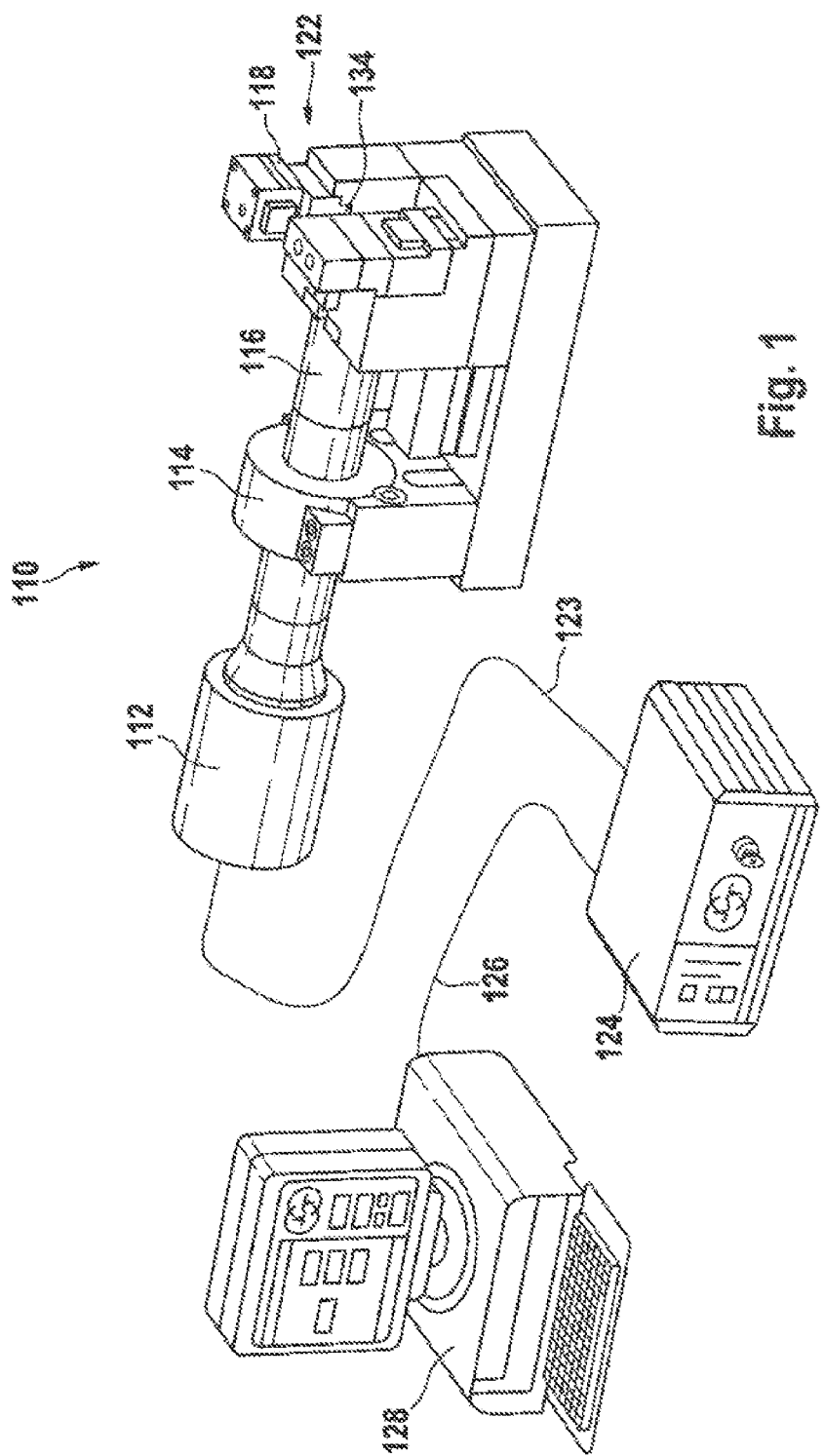

METHOD FOR PRODUCING A NODE BY WELDING WITH THE SAME WIDTH FOR TWO WELDS

This application is a 371 of PCT/EP2014/064867, filed on Jul. 10, 2014, which claims priority to German Application No. 102013107637.8, filed Jul. 18, 2013.

The invention relates to a method for producing a node by welding at least one first stranded wire comprising individual wires to at least one second stranded wire comprising individual wires, the stranded wires being of different materials, in a compression chamber with adjustable height and width of an ultrasonic welding device, the width being adjusted by means of at least one lateral slide and the height by changing the distance between a sonotrode and a counter electrode of the ultrasonic welding device, the at least one first stranded wire being welded with a higher specific energy, under a higher pressure or with a greater ultrasonic vibration amplitude than the at least one second stranded wire.

The stranded wires used for producing nodes, i.e. intermediate nodes and end nodes, are in conventional applications generally made of similar material groups because otherwise it would not be possible to achieve reproducible welding results.

If stranded wires consisting of individual wires or strands made of aluminum or aluminum material, are welded to one another or to a solid carrier, the disadvantage occurs that the input welding energy produces an amount of aluminum flow that there will be pick-up on the sonotrode surface or on the lateral boundaries of a compression chamber in which the stranded wires are welded together. According to DE 10 2007 026 707 B3, a special shape of the compression chamber is therefore selected which is delimited by a sonotrode that has the geometry of an open trapezoid, in order to weld aluminum wires to one another and to a carrier consisting of copper.

For ultrasonic joining of lacquered wires consisting of aluminum and/or copper, DE 102 29 565 B4 proposes an enclosure, which in particular consists of a copper material, into which the wires are introduced and then joined by ultrasonic welding.

A method for producing a welding connection between electrical conductors according to DE 10 2005 048 368 B3 is characterized in that a first inherently stiff electrical connector is successively connected to second electrical conductors such as stranded wires by welding. The advantage here is that the total cross section of the second electrical conductors to be connected to the first electrical conductor can be larger than the cross sections of stranded wires that can typically be welded with the ultrasonic welding device used.

Document DE 10 2011 014 801 A1 discloses a method for welding conductors in which initially first thin conductors are welded to a first node, which is then welded with thicker second conductors to yield an overall node.

It is the object of the present invention to develop a method of the type described above further, such that stranded wires of a first material can be welded with stranded wires of a second material, which has clearly different welding properties from the first material, to a node in such a manner that reproducible welding results can be achieved, in particular reproducible geometry, tensile strength and peel strength of the node to be produced. Clearly different welding properties means that the specific energy, optimum welding pressure and/or the optimum amplitude for achieving a proper weld deviate considerably, as becomes apparent from FIGS. 6 and 7.

For achieving this object, the invention substantially proposes that the at least one first stranded wire is inserted in the compression chamber and its individual wires are welded to a partial node, wherein the compression chamber is set to a width B in such a manner that the partial node completely covers the bottom of the compression chamber delimited by the sonotrode or a section thereof, that the at least one second stranded wire is inserted on the partial node in the compression chamber, and after closing the compression chamber the at least one second stranded wire is welded to the partial node to yield a total node, wherein the width of the compression chamber when welding the total node is equal to the width B.

According to the invention, a two-stage welding process of the stranded wires consisting of individual wires of different materials takes place in that first, a partial node is welded together from the first stranded wire(s), for which for example a higher welding energy is required compared to the second stranded wire(s) consisting of a different material. In addition, the compression chamber is set such that the first stranded wire(s) required for producing the node completely cover the bottom of the compression chamber, such that a partial node that covers the bottom is available after welding. The bottom is formed by the sonotrode or a section thereof.

After welding the partial node, the compression chamber is opened without changing its width setting. The fact that the width setting is not changed does not exclude that the lateral slide can be depressurized after completion of the first welding step, such that at least a wider compression chamber is available when placing the second stranded wire(s) in it. But this is not a mandatory feature. Instead, the width of the compression chamber can remain unchanged when the compression chamber is opened. In other words, the contact pressure can optionally be reduced or the lateral slide can be pressureless to enable, in particular, easy lifting of the anvil for opening the compression chamber.

Then the second stranded wire(s) is/are inserted on the partial node in the opened compression chamber and, after closing the compression chamber, welding energy corresponding to the required welding energy for the second stranded wire(s) is introduced to weld the individual wires of the second stranded wire(s) to one another and to the partial node. According to the teaching of the invention, the compression chamber in this second welding process step has the width B to which the compression chamber has been set in the first welding process step.

It is in particular envisaged that the width of the compression chamber is set to the width of the node to be produced and remains unchanged during welding.

When complying with these measures, it surprisingly turned out that constant welding results with respect to strength or geometry of the node can be achieved. Compared to methods in which the stranded wires to be welded are not inserted successively in a predetermined order, there is also no noticeable amount of wire deformations or wire breakage.

Based on the teaching according to the invention, the connecting surface between the partial node and the second stranded wire(s) can be set such that a connecting surface of the desired area is provided, taking into account the different materials and their welding parameters. In particular, the welding width can be increased.

It is preferred that at least one first stranded wire consists of copper or a copper alloy and/or that at least one second stranded wire consists of aluminum or an aluminum alloy.

Other features can be derived from the dependent claims.

Other details, advantages and features of the invention can be derived not only from the claims and the features that can be derived from them—either individually or in combination—but also from the subsequent description of a preferred exemplary embodiment that can be seen in the figure.

Wherein:

FIG. 1 is a schematic diagram of an ultrasonic welding arrangement.

Figure 2A:
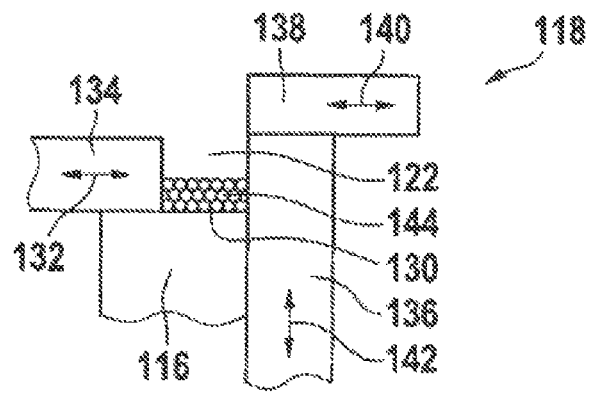
FIGS. 2 to 5 are schematic flow diagrams of the method for welding nodes.

FIG. 1 shows the schematic diagram of an ultrasonic welding arrangement which is used, according to the teaching of the invention, to weld stranded wires which consist of materials with different welding properties to intermediate and end nodes. Clearly different welding properties basically mean that the materials to be welded differ by more than 25% with respect to specific energy, pressure, or ultrasonic vibration amplitude. The specific energy is the energy to be input per mm² of stranded wire to be welded in order to achieve a proper welding result. Pressure means the surface pressure that acts on the stranded wire(s) to be welded in the direction of the sonotrode, that is, its surface that delimits the compression chamber.

In other words, the pressure required for welding the second material is by at least 25% smaller than the pressure required for welding the first material, wherein the same cross section of the material to be welded and the same width of the compression chamber are assumed.

The vibration amplitude when welding the second material is by at least 10% smaller than the vibration amplitude when welding the first material, wherein the same cross section of the first and second materials to be welded is assumed.

The arrangement includes an ultrasonic welding device 110, which as usual includes a converter 112, optionally a booster 114 and a sonotrode 116, which in total are called transducers. A multi-part counter electrode 118—also called anvil—and a lateral slide 134 are associated with the sonotrode 116 or a section thereof. A respective design is described in detail in DE 37 19 083 C1, whose disclosure is expressly referenced here.

The sonotrode 116 or its surface, respectively, the counter electrode 118 and the slider 120 delimit a compression chamber 122, in which the first and second stranded wires consisting of individual wires and to be welded together are inserted.

The converter 112 is connected via a line 123 to a generator 124, which itself is connected to a line 126 and leading to a computer 128 through which the welding processes are controlled, into which the welding parameters can be entered and from which stored values can be retrieved. In this respect, we make reference to well-known technologies.

According to the invention, the first and second stranded wires are welded to end or intermediate nodes using a respective ultrasonic welding arrangement and the ultrasonic welding device including the compression chamber 122. The process flow of welding is explained with reference to FIGS. 2 to 5 in which the same reference symbols are used for the same elements.

FIGS. 2 to 5 show a section of the compression chamber 122 and the elements that form its boundaries. The bottom boundary of the compression chamber 122 is formed by a surface 130 of the sonotrode 116, which acts as a welding surface. The lateral boundaries of the compression chamber 122 are formed by a lateral slide 134 that can be moved in the direction of the double-headed arrow 132 and a so-called surface plate 136 which forms a part of the counter electrode 118. The surface plate 136 receives a transverse head 138 which can be adjusted in accordance with the double-headed arrow 140 and extends opposite the bottom of the compression chamber 122, that is, the surface 130 of the sonotrode 116, during compressing or welding the stranded wires that can be inserted in the compression space 122. The surface plate 136 can be adjusted along the double-headed arrow 142 to adjust the transverse head 138 in the direction of the sonotrode 118 and thus to apply the required pressure to the stranded wires to be welded for compression during welding. The surfaces of the surface plate 136 and lateral slide 134 on the one hand and the surface 130 of the sonotrode 116 and the surface of the transverse head 138 that faces it on the other hand, which all form the boundaries of the compression chamber 122, run in particular parallel to one another, as can be seen in the figures. The boundary surfaces may further be structured.

Figure 2B:
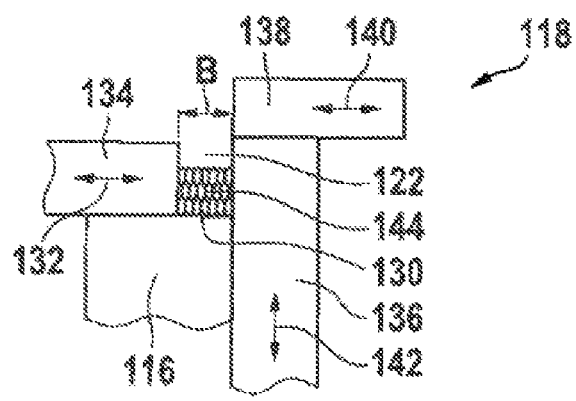

The compression chamber 122 is open in FIG. 2. One or more first stranded wires 144, which are each composed of individual wires, are inserted in it. The number of the individual wires or their volume is such that the bottom of the compression chamber 122 is completely covered with individual wires after setting the lateral slide 134 to a desired width B (FIG. 2b). In the exemplary embodiment, the width B is set after the first stranded wires 144 have been inserted, but it can also be set before the first stranded wires 144 are inserted.

The first stranded wires can be made of copper or copper alloys or materials with a copper content of at least 40%.

Figure 3:
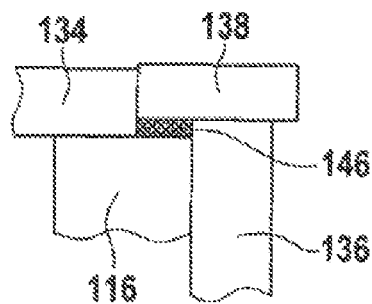

After the first stranded wires were inserted in the compression chamber 122 and the compression chamber 122 was set to the width B, the transverse head 138 is moved to the left in the figure and lowered to compact the first stranded wires 144 and weld them to a partial node 146, as can be seen in FIG. 3. In this process, the sonotrode 118 is set into oscillation at a frequency that is preferably in the range of 20 kHz. The amplitude is between 15 μm and 35 μm depending on the material to be welded.

For welding the first stranded wires, a parameter set including, for example, node width, energy, pressure, amplitude, or differential dimension or welding specifications or time depending on the requested welding mode which takes into account the materials of the first stranded wires and the geometry of the partial node to be produced, is retrieved from the computer 128. The compacting specifications, welding specifications, duration, pressure, adjustment length (change of the height Δh of the compression chamber), to just name a few parameters, are monitored during compacting and welding.

Figure 4:
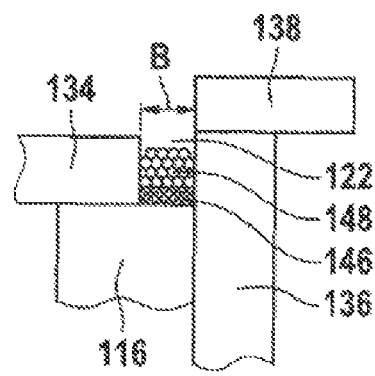
Figure 5:
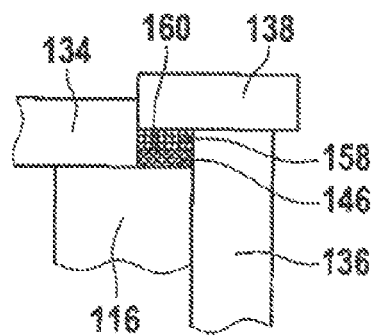

After welding the partial node 146, the compression chamber 122 is opened as shown in FIG. 4, but without changing the set width B of the compression chamber 122. There is a chance that the lateral slide 134 remains in the position preset before the first stranded wires 144 are welded or that the lateral slide 134 is relieved by reducing the pressure to make the vertical motion (double-headed arrow 142), i.e. adjusting the surface plate 136 together with the transverse head 138 for opening the compression chamber 122. At the same time, the transverse head 138 is moved to the right in the figure.

Then one second stranded wire or multiple second stranded wires 148 is/are inserted in the compression chamber 122 that consist(s) of a material that has different welding properties than the material of the first stranded wires 144, that is, is different with respect to specific energy, pressure, or amplitude, wherein it is assumed that the variation at least with respect to the specific energy s at least 25%.

In principle, the specific welding energy required for welding is selected as the criterion, wherein those stranded wires that need a higher welding energy are first welded to a partial node. The specific welding energy can also be viewed as a synonym for other material characteristics that are selected to produce a node according to the teaching of the invention, wherein that respective material characteristic is markedly different between the first and second stranded wires 144, 148, as explained above.

After the second stranded wire(s) 148 were inserted in the compression chamber 122 and the compression chamber 122 again has the width B that was selected in the first welding process, i.e. when producing the partial node 146, the compression chamber 122 is reduced in size as explained in the process flow according to FIGS. 2 and 3 by adjusting the transverse head 138 and lowering the surface plate 136, and the second stranded wires 148 are compacted and their individual wires are welded to one another and to the partial node 146, respectively. A second partial node 158 is formed which has been welded together with the first partial node 146 to produce the aggregate node 160.

When the lateral slide 134 was depressurized for opening the compression chamber 122 after completion of the first welding process, the pressure acting on the lateral slide 134 is built up again before the second welding process, such that the compression chamber 122 once again has the width B in the second welding process.

The second stranded wires 148 are in particular stranded wires whose individual wires consist of aluminum or aluminum alloys. The required welding parameters are also stored in the computer 128 and are retrieved accordingly. There also is process monitoring during compacting and welding, wherein compacting specifications, welding specifications, duration, and optionally, differential dimension and energy are recorded.

According to the teaching of the invention, constant welding results that are reproducible can be achieved compared to prior art. In this way, process-reliable production of nodes consisting of a material mix is achieved. The node structure can be reproduced in its geometry.

In the first and second welding processes, that is, when welding first a first stranded wire 144 and then at least one second stranded wire 148, process monitoring can be performed such that the first and the second process steps can be performed differently with respect to tolerances or monitoring the welding flow and the result. Individual adjustment is possible, that is, different parameters and tolerances are employed. For example, the welding time can be monitored after the required energy input when welding the at least one first stranded wire 144 made of copper or containing copper. If the welding time is not within predetermined values, the welding process is not rated appropriate.

When welding the at least one second stranded wire 148 made of aluminum or containing aluminum, the differential dimension can be applied, that is, the adjustment length and thus the change in height of the compression chamber 122 is monitored after determining the compacting specifications. If the predetermined length is reached, the system checks if the required energy was input. If this is not true, a faulty welding is assumed.

Figure 6:
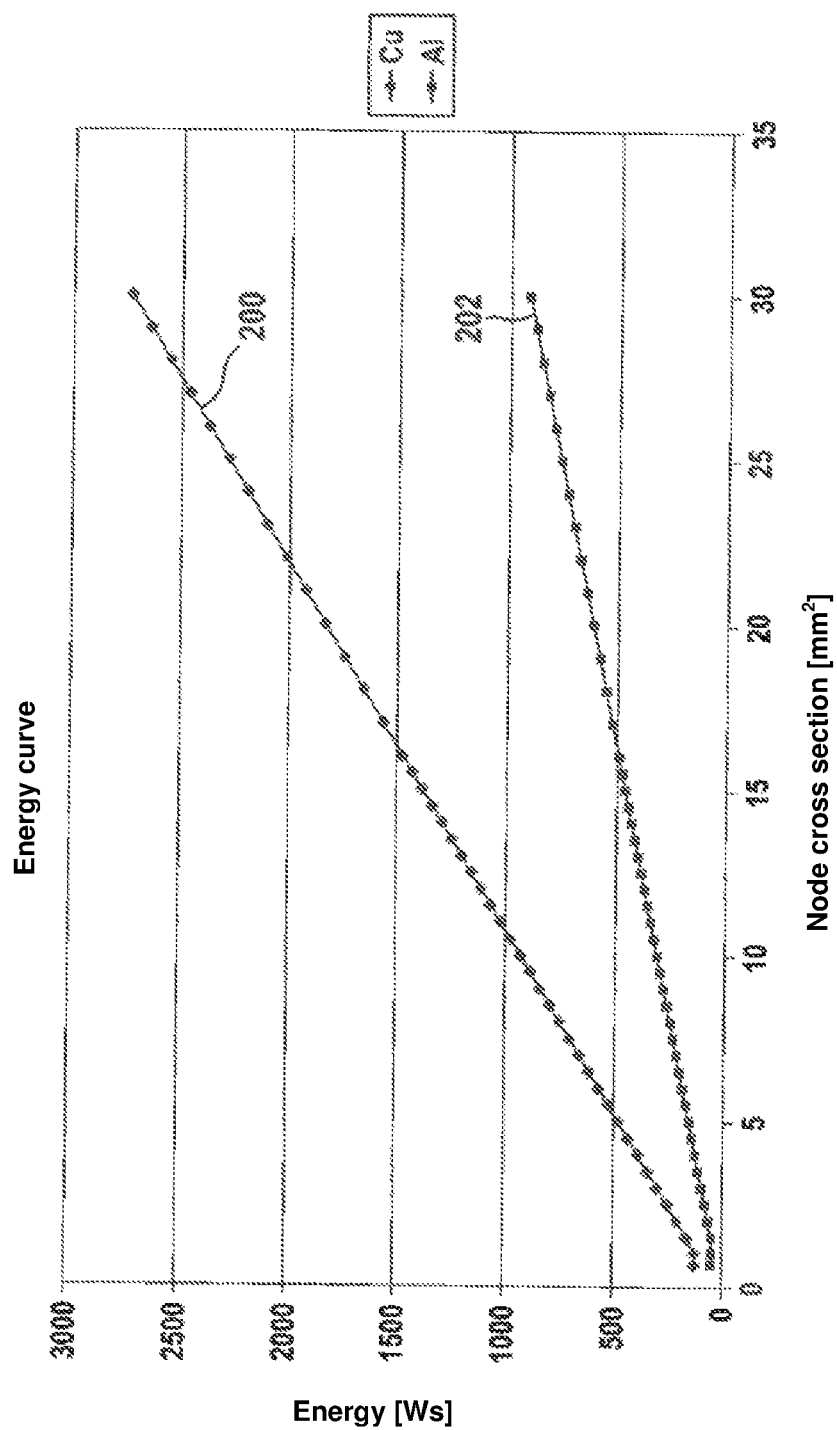
FIG. 6 is a graphic representation of the energy input into stranded wires as a function of the node cross section to be produced and the material of the stranded wires.
Figure 7:
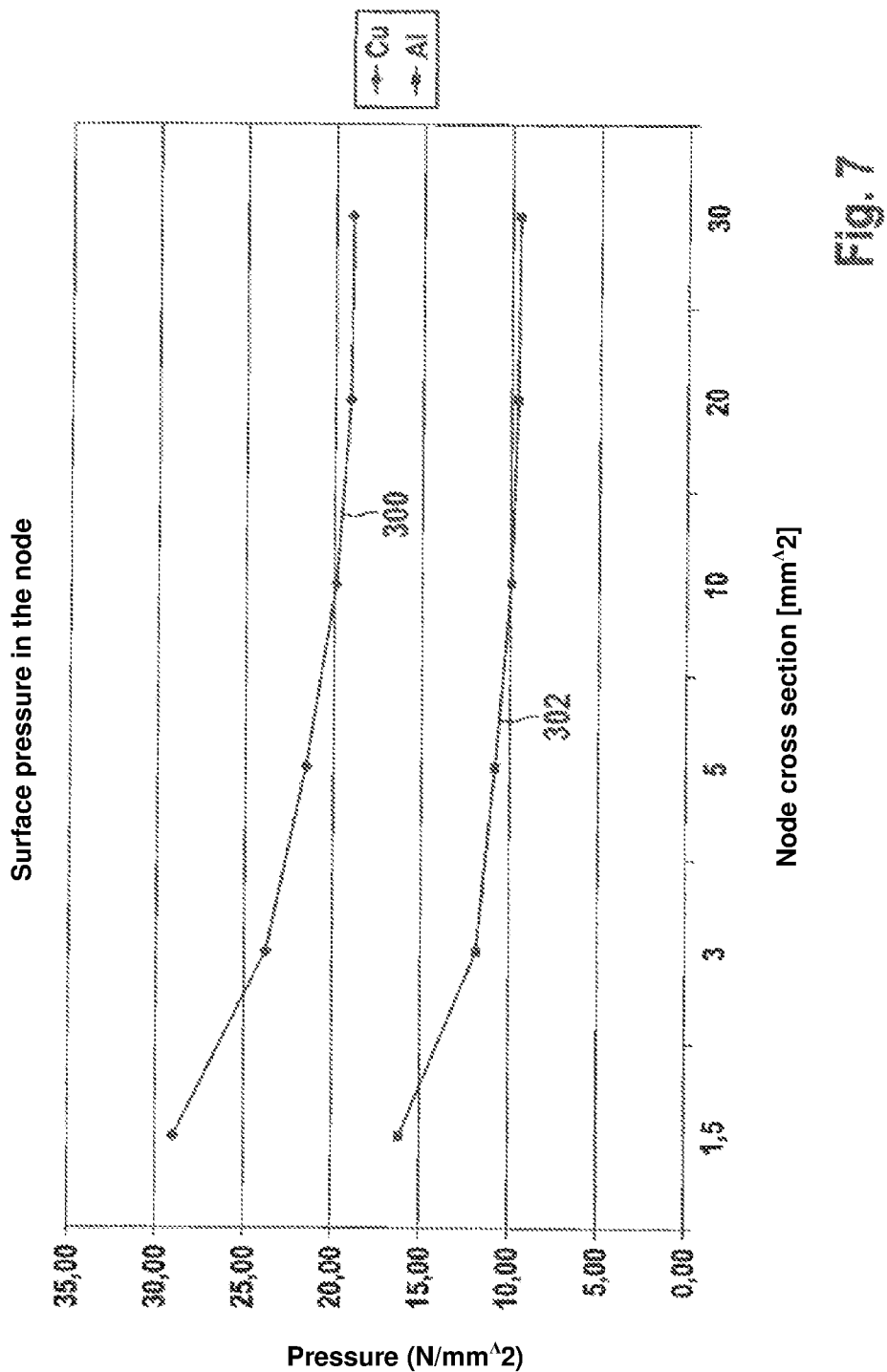
FIG. 7 is a graphic representation of the pressure required for welding as a function of the node cross section to be produced and the material of the stranded wire.

FIGS. 6 and 7 are used to illustrate in principle what should be understood by "considerably deviating welding properties of the materials to be welded." FIG. 6 plots the energy to be introduced to the materials to be welded as a function of the node cross section. The upper curve with the reference symbol 200 is the energy input in stranded wires consisting of copper. The energy input as a function of the node cross section is called specific energy. Curve 202 shows the energy input in stranded wires consisting of aluminum as a function of the node cross section. One can see the considerable difference between the energy to be input as a function of the node cross section depending on the material to achieve proper welding results.

The node cross section is the area that extend perpendicular to the longitudinal axis of the stranded wires and perpendicular to the welding surface, which is a section of the sonotrode that delimits the bottom of the compression chamber.

FIG. 7 shows the pressure as a function of the node cross section to be produced as a material characteristic, both for the materials copper (curve 300) and aluminum (curve 302). If the pressure as a function of the node cross section is selected as a material characteristic for selecting the welding order in accordance with the teaching of the invention, i.e. the surface pressure that acts in the direction of the welding surface of the sonotrode during welding on the strands or wires of the stranded wires, the pressure required for welding copper considerably deviates from the pressure required for aluminum. Therefore the partial node made of or containing copper is welded first, then the stranded wire(s) made of or containing aluminum are welded.

The first and second materials differ with respect to the welding parameter pressure in that the pressure to be input for welding the second material is at least 25% less than the pressure for welding the first material. In this evaluation, the same cross section of the stranded wires to be welded and the same width of the compression chamber are assumed.

According to the teaching of the invention, stranded wires can be welded which differ in material characteristics in that the ultrasonic vibration amplitude for welding deviate by at least 25%, i.e. the ultrasonic vibration amplitude for the second material is at least 10% smaller than the ultrasonic vibration amplitude for welding the first material.

The invention claimed is:

1. A method for producing a node by welding at least one first stranded wire (144) comprising individual wires to at least one second stranded wire (148) comprising individual wires, the stranded wires being of different materials, in a compression chamber (122) with adjustable height and width of an ultrasonic welding device (110), the width being adjusted by means of at least one lateral slide (134) and the height by changing the distance between a sonotrode (116) and a counter electrode (118) of the ultrasonic welding device, the at least one first stranded wire being welded with a higher specific energy, under a higher pressure or with a greater ultrasonic vibration amplitude than the at least one second stranded wire, characterized in that the at least one first stranded wire (144) is inserted in the compression chamber (122) and its individual wires are welded to a partial node (146), wherein the compression chamber is set to a width B in such a manner that the partial node completely covers the bottom of the compression chamber delimited by the sonotrode (116) or a section thereof, that the at least one second stranded wire is inserted on the partial node in the compression chamber, and after closing the compression chamber the at least one second stranded wire (148) is welded to the partial node to yield an aggregate node, wherein the width of the compression chamber when welding the aggregate node is equal to the width B.

2. The method according to claim 1,
characterized in that
the width of the compression chamber (122) is set to the width B of the node (160) to be produced before the at least one first stranded wire (144) is inserted in said chamber.

3. The method according to claim 1,
characterized in that
after welding the at least one first stranded wire (144) to the partial node (146), the lateral slide (134) is depressurized and pressure is reapplied to the lateral slide such that the compression chamber has the width B before the at least one second stranded wire (148) is welded.

4. The method according to claim 1,
characterized in that
that such materials are selected for the at least one first and the at least on second stranded wires (144, 148) that with respect to the material of the at least one first stranded wire at least 25% more energy must be input for welding a proper partial node (146) than for proper welding of the at least one second stranded wire.

5. The method according to claim 1,
characterized in that
for evaluating the proper welding of the at least one first stranded wire (144), a process parameter other than the one for monitoring proper welding of the at least one second stranded wire (148) is monitored.

6. The method according to claim 1,
characterized in that
the energy input required is monitored based on the specified welding time for monitoring the proper welding of the at least one stranded wire (144).

7. The method according to claim 1,
characterized in that
for determining proper welding of the at least one second stranded wire (148), the energy input depending on the height change of the compression chamber (122), in particular the adjustment of the counter electrode (118) in the direction of the sonotrode (116) is monitored.

8. The method according to claim 1,
characterized in that
copper or a copper alloy is used as the material of the at least one first stranded wire (144).

9. The method according to claim 1,
characterized in that
aluminum or an aluminum alloy is used as the material of the at least one second stranded wire (148).

* * * * *

UNITED STATES PATENT AND TRADEMARK OFFICE
CERTIFICATE OF CORRECTION

PATENT NO. : 9,505,083 B2  
APPLICATION NO. : 14/897843  
DATED : November 29, 2016  
INVENTOR(S) : Sebastian Rühl Page 1 of 1

It is certified that error appears in the above-identified patent and that said Letters Patent is hereby corrected as shown below:

On the Title Page

(72) Inventors should read: Sebastian Rühl, Wetter (DE); Heiko Strobel, Munzenberg (DE); Tim Hanika, Langgoens/Oberkleen (DE)

Signed and Sealed this  
Eighteenth Day of April, 2017

Michelle K. Lee  
*Director of the United States Patent and Trademark Office*